United States Patent Office 3,150,138
Patented Sept. 22, 1964

3,150,138
METHOD OF PREPARING MONOQUATERNARY
NITROGEN COMPOUNDS
Frank Miller, Wilmington, Del., assignor to Air Products
and Chemicals, Inc., a corporation of Delaware
No Drawing. Filed Feb. 14, 1961, Ser. No. 89,111
5 Claims. (Cl. 260—268)

This invention relates to cage structure heterocyclic nitrogen compounds having both a quaternary nitrogen and a tertiary nitrogen and to methods of preparing the same. These monoquaternary nitrogen compounds can be designated as 1-alkyl-4-aza-1-azoniabicyclo-(2.2.2)-octane halides and 1-alkyl-4-aza-1-azoniabicyclo-(2.2.2)-octane hydroxides. Such compounds have the generic structure

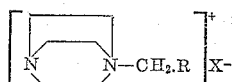

in which R is hydrogen or a hydrocarbon radical of up to 10 carbon atoms; and X is either halogen of the group consisting of chlorine, bromine and iodine, or hydroxyl. The quaternizing group of the quaternary nitrogen is always a primary group and is attached to the quaternary nitrogen through a $CH_2$ linkage; accordingly, the substituents are considered alkyls and include the radicals derived from aliphatic hydrocarbons and substituted aliphatics such as the benzyl radical, $C_6H_5CH_2$.

In prior art literature, such as an article by S. Oae et al., J. Org. Chem. 24, 1348 (1959), both mono and diquaternary derivatives of 1,4-diazabicyclo-octane are described. Oae et al. show the formation of diquaternary compounds from primary alkyl halides. The only monoquaternary compounds obtained were formed from secondary alkyl halides because of a simultaneous substitution and dehydrohalogenation reaction. No primary compounds were formed. Oae et al. employed solvents such as methanol, carbon tetrachloride and acetone with variations in the reflux time controlled in part by the ease of reactivity of the halide employed.

In accordance with the present invention, an alkyl- or aralkyl halide (chloride, bromide or iodide) having 1 to 11 carbon atoms, is added to a solution of 1,4-diazabicyclo-(2.2.2)-octane in a hydrocarbon solvent, and the reaction mixture is heated at a temperature of at least 80° C. for at least one hour, thereby forming and precipitating solid 1 - alkyl - 4-aza-1-azoniabicyclo-(2.2.2)-octane halide, which is separated from the cooled reaction mixture. Conversion of the halide to the hydroxide is readily effected by base exchange.

The nature of the invention is further clarified by reference to a plurality of examples.

Example I

A resin kettle having a water-cooled reflux condenser contained a solution of 224 g. (2 mols) of triethylenediamine in one liter of benzene, which solution contained about 20% by weight or about 15 mol percent triethylenediamine. Into the refluxing and stirred solution, 210 g. (2.27 mols or 13.5% excess) of 1-chlorobutane was added dropwise during an hour. The refluxing and stirring were continued for an additional 16 hours. The 1-chlorobutane reacted with triethylenediamine to form a monoquaternary salt. Of particular importance, 1-n-butyl-4-aza-1-azoniabicyclo-(2.2.2)-octane chloride was so insoluble in the refluxing benzene that as it formed, it precipitated. Even after the addition of the excess butyl chloride, none of the precipitated monoquaternary salt reacted therewith, inasmuch as the reaction conditions were too mild to initiate reaction between the solid precipitate and the dissolved butyl chloride.

The solution was cooled to room temperature and filtered through a Büchner funnel. The precipitate was rinsed with one liter of benzene, partially dried under a heat lamp for 90 minutes and then further dried in a vacuum oven overnight at about 65° C. The 371 g. of butyl monoquaternary salt recovered was 91% of the stoichiometric yield. The compound, 1-n-butyl-4-aza-1-azoniabicyclo-(2.2.2)-octane chloride, was a free-flowing white powder, soluble in water, and had a melting point over the range of 101–103.5° C.

Example II

A 4 liter resin kettle contained 1 liter of benzene and 224 g. (2 mols) of triethylenediamine. This solution was stirred and maintained at the initial reflux temperature during the dropwise addition of 1136 g. (8 mols plus 123.4 g. or a severalfold excess) benzenyl chloride during 2 hours. The temperature was maintained at about 85° C. for an additional 4 hours. The reaction mixture was cooled, and the precipitated product was filtered on a Büchner funnel, rinsed with 1 liter of benzene, triturated with acetone, and vacuum dried at 60° C. The 1-benzyl-4-aza-1-azoniabicyclo-(2.2.2)-octane chloride was analyzed for chloride content and found to have 14.86% chlorine ± 0.04% thus confirming the monoquaternary structure, 14.85% being the theoretical chloride content of the desired compound, and distinguishing it from the dibenzyl diquaternary compound which contains 19.4% chloride. Thus a considerable excess of highly reactive benzyl chloride does not prevent the isolation of the monoquarternary salt in high purity. Other preparations of 1-benzyl-4-aza-1-azoniabicyclo-(2.2.2)-octane chloride may involve the use of a smaller quantity of benzyl chloride; however, the presence of a relatively large excess of the haloalkane has advantages of increasing yields and reducing reaction time; the unreacted portion is readily recovered for reuse.

In demonstrating the usefulness of the monoquaternary triethylenediamine salts of the present invention, samples of sheet steel are electrolytically nickel plated in an aqueous nickel chloride before and after the addition of the monoquaternary salt to the electroplating bath. The combination of the tertiary amine group and the quaternary group modifies the electroplating action so that the nickel plate is brighter, more adherent and more satisfactory than in the absence of the monoquaternary triethylenediamine salt. The nickel to quaternary mol ratio is desirably about 2 to 1.

Example III

Halide salts of 1-benzyl-4-aza-1-azoniabicyclo-(2.2.2)-octane are prepared following the general procedure of Example II but using benzyl bromide and benzyl iodide instead of benzyl chloride.

In each case, a satisfactorily pure monoquaternary benzyl triethylenediamine salt is obtained. By treatment of an aqueous solution of the monoquaternary salt with an excess of the hydroxide form of ion exchange resin, such salt solution may be converted to the corresponding quaternary hydroxide solution.

Example IV

Monoquaternary triethylenediamine chloride salts are prepared following the general procedure of Example I but using instead of 1-chlorobutane other reactive primary monochlorohydrocarbons having from 1 to 11 carbon atoms. High purity compounds, free from the diquaternary chloride salts, are obtained by using such compounds as chloromethane, 1-chloropropane, 1-chloropentane, 1-chloro-2,2,3,3-tetramethylbutane, or 1-chloromethylnaphthalene. It is to be noted that reactions involving compounds which may be fugitive at about or below the reaction temperature (of about 80° C. or higher) are effected in a suitably closed system; such low boiling compounds include chloromethane, chloroethane and 1-chloropropane. The method is operable when the organic halide is selected from compounds designated by the formula $C_nH_yX$ in which $n$ is a number from 1 to 11 and $y$ is a number not greater than $2n$ plus 1, and in X is an element selected from the group consisting of chlorine, bromine, and iodine. The halide salt of 1-alkyl-4-aza-1-azoniabicyclo-(2.2.2)-octane is converted to the hydroxide compound by any conventional procedure; one such treatment of preferred form includes treating an aqueous solution of the halide salt with granules of the basic form of ion exchange resin. Such uses include catalysis, apparently through the quaternary function, of the polymerization of isocyanates and propylene oxide; also, polyurethane formation is promoted, apparently through the tertiary amine function of these compounds.

The quaternary hydroxide compound has a variety of special uses. Certain quaternary salts can be made by exchange of one halide for another halide by treatment of one quaternary salt with a suitable ion exchange resin. Likewise, the hydroxide form may be used in the preparation of whatever salt is desired by neutralization with the corresponding acid, which might be a hydrohalic acid such as hydrochloric, hydrobromic, or hydriodic acid.

Obviously many modifications and variations of the invention as hereinbefore set forth may be made without departing from the spirit and scope thereof, and therefore only such limitations should be imposed as are indicated in the appended claims.

What is claimed is:

1. The method of preparing a monoquaternary triethylenediamine halide salt having the formula:

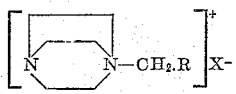

in which X designates an anion selected from the group consisting of chlorine, bromine and iodine, and in which R is selected from the group consisting of H, phenyl, and alkyl having up to 10 carbon atoms; which method consists of the steps of: preparing a hot solution of triethylenediamine in benzene; adding to such hot solution a hydrocarbon halide $RCH_2X$ in which R and X are as previously defined; agitating the reaction mixture of triethylenediamine, hydrocarbon halide and the benzene solvent at a temperature of at least 80° C. for more than one hour to precipitate the monoquaternary triethylene diamine salt; cooling the reaction mixture; separating the precipitated monoquaternary salt; and removing occluded liquid from the salt.

2. The method of claim 1 in which the molar quantity of $RCH_2X$ is greater than the molar quantity of triethylenediamine and in which all of the excess $RCH_2X$ is removed with the solvent and in which no contaminant diquaternary triethylenediamine salt forms because of the insolubility of the monoquaternary triethylenediamine in the benzene solvent.

3. The method of claim 1 in which $RCH_2X$ is normal butyl chloride.

4. The method of claim 1 in which $RCH_2X$ is benzyl chloride.

5. The method of preparing monoquaternary compounds having the formula.

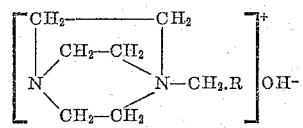

in which R is selected from the group consisting of hydrogen, phenyl, and alkyl of up to 10 carbon atoms; which method includes the steps of: preparing a hot solution of 1,4-diazabicyclo-(2.2.2)-octane in a benzene solvent; adding to such hot solution an organic halide compound containing the $RCH_2$— radical attached to halogen in which the R is defined as in the formula and halogen is selected from the group consisting of chlorine, bromine, and iodine; agitating the reaction mixture of 1,4-diazabicyclo-(2.2.2.)-octane, organic halide and the benzene solvent at a temperature of at least 80° C. for more than one hour to precipitate a monoquaternary halide; cooling the reaction mixture; separating the precipitated monoquaternary halide; removing occluded liquid from the salt; preparing an aqueous solution of the salt; and treating the aqueous solution with an excess of granules of basic ion exchange resin having exchangeable hydroxide ions.

References Cited in the file of this patent

UNITED STATES PATENTS

| 2,834,779 | Biel et al. | May 13, 1958 |
| 2,973,361 | Rudner | Feb. 28, 1961 |
| 3,010,963 | Erner | Nov. 28, 1961 |

OTHER REFERENCES

Oae et al.: "Quaternary Ammonium Salts of 1,4-Diazabicyclo-[2.2.2]-octane," Journal Organic Chemistry, vol. 24, pp. 1348–9 (1959).

Farkas et al.: "Triethylenediamine," Industrial and Engineering Chemistry, vol. 51, page 1299 (1959).